UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

MAGNESIUM PERBORATE.

No. 816,925.  Specification of Letters Patent.  Patented April 3, 1906.

Application filed February 17, 1905. Serial No. 246,069.

*To all whom it may concern:*

Be it known that I, OTTO LIEBKNECHT, a subject of the German Emperor, and a resident of Frankfort-on-the-Main, Germany, have invented a certain new and useful Composition of Matter, of which the following is a specification.

My invention relates to the production of magnesium perborate as a new composition of matter. The process for producing the same may be varied and forms no part of this invention, the essential feature of which is the production of magnesium perborate as a new product of manufacture.

I shall describe the process I prefer for producing magnesium perborate, first stating the same generally and then giving a specific example.

An alkali peroxid, such as sodium peroxid, is added to water, the solution being cooled during the addition to prevent any considerable rise in temperature. Then the magnesium salt—for instance, magnesium sulfate or magnesium chlorid dissolved in water—is permitted to flow in while the solution is being well stirred and further cooled. Finally, very finely-pulverized boracic acid is added.

The mixture is then stirred for a short time, and the magnesium perborate is separated by filtration from the liquid. The perborate is then dried by subjecting the same to a fairly-low degree of temperature. The remaining liquid may be used in the subsequent practice of the process by adding to one part of the same sodium peroxid and dissolving in the other part the magnesium salt to be used.

The following example will more fully illustrate the process: Eight hundred and thirty grams of sodium peroxid (ninety-four per cent.) are added to four liters of water, the mixture being stirred and cooled during the addition. Continuing the stirring, a solution of two kilograms of magnesium chlorid, $(MgCl_2+6H_2O,)$ for instance, in about four liters of water, is slowly poured in, and finally eight hundred and fifty grams of boracic acid, $B(OH)_3$, in a finely-pulverized state, is added. Seventy cubic centimeters of muriatic acid (1.12 specific gravity) is preferably added to the magnesium-chlorid solution, corresponding to the excess of alkali. The compound should be stirred for about half an hour, the precipitate of magnesium perborate being then filtered off, the filtrate being used in the further operation of the process, as set forth.

Magnesium perborate is a white amorphous precipitate and resembles in its most important properties magnesium borate. Treating the same for some length of time with water, acid magnesium perborate goes into solution, leaving basic magnesium perborate, so that in treating with water only a more or less basic product is obtained—*i. e.*, a product with a varying amount of boracic acid and active oxygen. A good washed product free from chlorid had the following contents: 32.7 per cent., $MgO$; 21.7 per cent., $B_2O_3$; 8.9 per cent., active $O$, 36.3 per cent., water.

That the product obtained is magnesium perborate and not simply a mixture of magnesium peroxid and boracic acid is shown by the fact that aside from the visible and chemical properties of the new body the yield of active oxygen is almost theoretical, while the yield of oxygen from magnesium peroxid is very much less. Magnesium perborate is of great durability and will find use for medicinal and bleaching purposes.

Having described my invention, what I claim, and desire to secure by Letters Patent of the United States, is—

As a new product of manufacture magnesium perborate, a white, amorphous precipitate in treating which for some length of time with water acid magnesium perborate goes into solution leaving basic magnesium perborate.

In testimony whereof I have hereunto signed my name in the presence of two subscribing witnesses.

OTTO LIEBKNECHT.

Witnesses:
HORST ZIEGLER,
CARL GRUND.